(No Model.) 3 Sheets—Sheet 1.

N. J. NILSON.
HAY RAKE AND COCKER.

No. 383,479. Patented May 29, 1888.

Witnesses.
S. J. Beardslee.
J. Jessen.

Inventor.
Nils J. Nilson.
By A. C. Paul atty.

(No Model.)  
N. J. NILSON.  
HAY RAKE AND COCKER.  
No. 383,479. Patented May 29, 1888.

Witnesses.
S. J. Beardslee
J. Jessen.

Inventor.
Nils J. Nilson.
By A. C. Paul atty (No Model.)

3 Sheets—Sheet 3

N. J. NILSON.
HAY RAKE AND COCKER.

No. 383,479. Patented May 29, 1888.

Witnesses.
S. J. Beardelee
J. Jessen.

Inventor.
Nils. J. Nilson.
By A. C. Paul atty.

UNITED STATES PATENT OFFICE.

NILS J. NILSON, OF MERIDIAN, WISCONSIN.

HAY RAKE AND COCKER.

SPECIFICATION forming part of Letters Patent No. 383,479, dated May 29, 1888.

Application filed October 24, 1887. Serial No. 253,160. (No model.)

*To all whom it may concern:*

Be it known that I, NILS J. NILSON, of Meridian, in the county of Dunn and State of Wisconsin, have invented certain new and useful Improvements in Hay Rakes and Cockers, of which the following is a specification.

My invention relates to improvements in machines for raking and cocking hay; and it consists, generally, in the combination and arrangement hereinafter described, and particularly pointed out in the claims.

Figure 1:
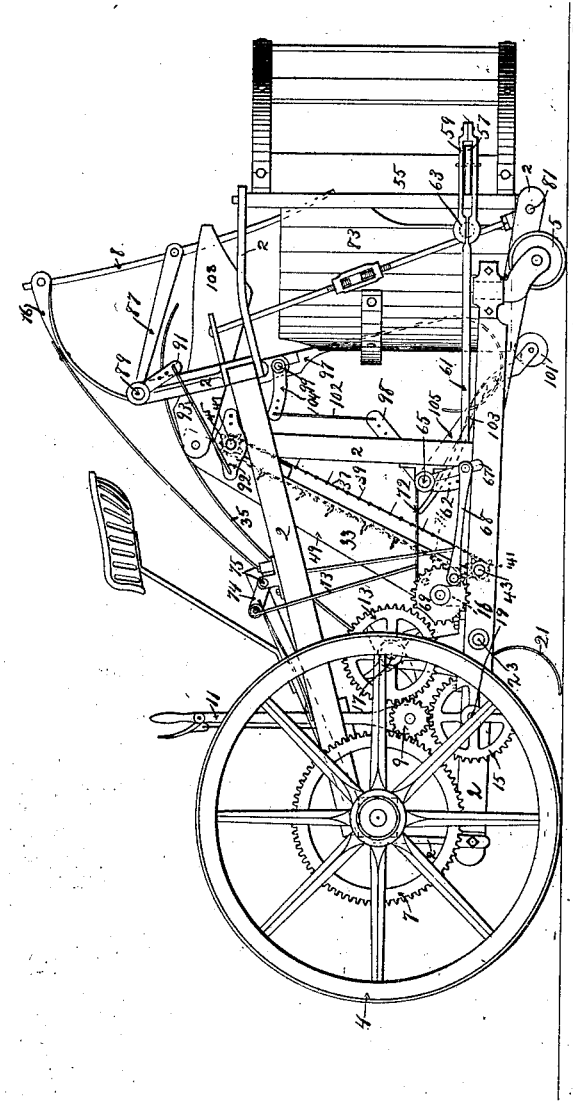
Figure 2:
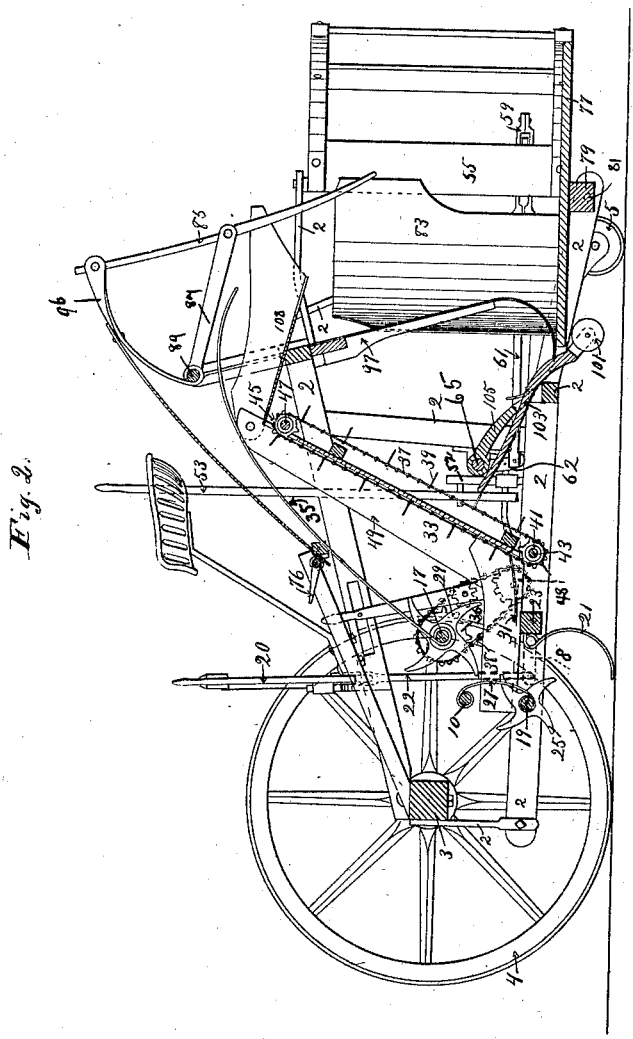
Figure 3:
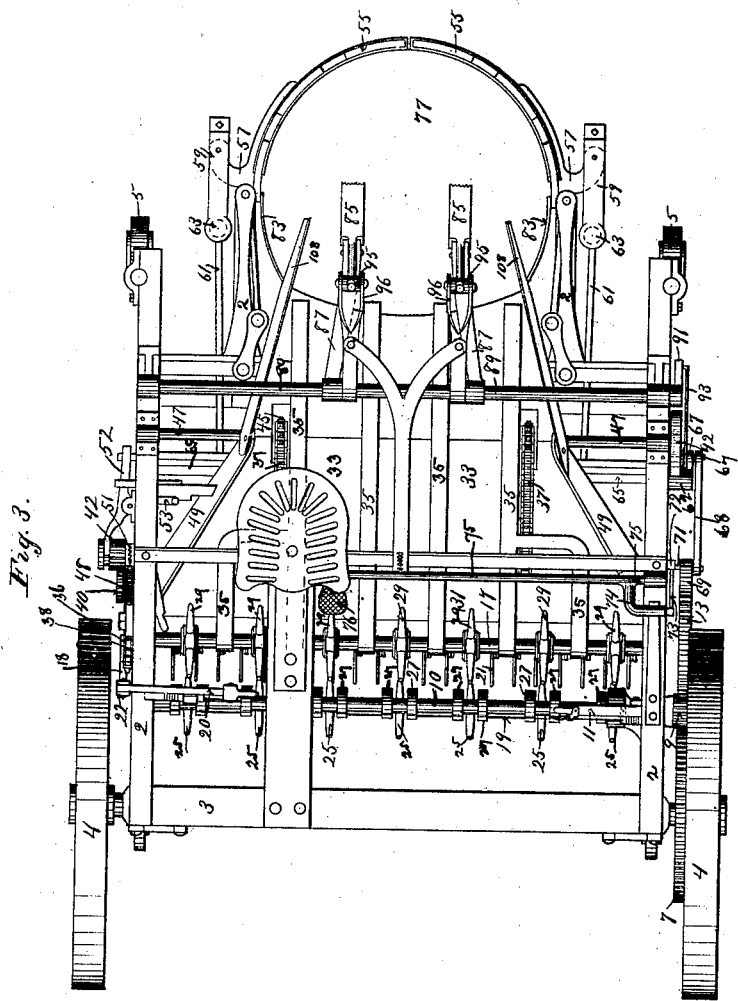

In the drawings, which form a part of this specification, Figure 1 is a side elevation of my improved machine. Fig. 2 is a central vertical section. Fig. 3 is a plan.

2 represents the frame of the machine, attached at the front end to the axle 3, supported by the wheels 4, and at the rear supported upon suitable truck-wheels, 5. The driving-wheels 4 revolve independently upon the axle, and to one of these driving-wheels I prefer to secure the gear 7, to transmit power to the working parts of the machine. A number of bars and braces are shown in the drawings, all of which I have marked 2, as they form parts of the main frame.

9 is an idler-pinion arranged to slide upon a stationary shaft, 10, and be thrown into or out of gear with the main gear-wheel 7 by means of a lever, 11, pivoted upon the frame of the machine and provided with a fork that engages the hub of the pinion. The pinion 9 meshes with the gear-wheels 13 and 15, mounted on shafts 17 and 19, extending across the machine, and revolves said shafts, and the machine is driven.

21 is a rake, preferably made with spring-teeth, located upon a cross-tie or rake-head, 23, pivoted to the frame. An arm or lever, 18, is secured to the pivoted rake-head and connected to an operating-lever, 20, by a rod, 22. The lever 20 is provided with a suitable catch to hold it in any required position, so that by throwing the lever backward or forward the rake may be turned on its axis and the teeth raised or lowered and held by the lever in any position at the will of the operator.

The shaft 19 passes across the frame forward of the rake 21 and is provided with a series of arms or beaters, 25, which raise the hay as it accumulates in front of the rake 21. A series of protecting bars or slats, 27, is placed between the arms 25 and secured at their upper ends to shaft 10 and at their lower ends to shaft 19, to prevent the hay from being carried around by the said arms. The shaft 17, lying horizontally above the shaft 19, is also provided with a series of arms, 29, which, as the shaft revolves, carry the hay back over the top of the rake and deliver it upon the platform 31 in front of the elevator 33.

35 are shields extending between the arms 29 upward and over the elevator, for the purpose of preventing the hay from being thrown off and scattered in its progress through the machine.

The elevator 33 preferably extends the full width of the machine, and is constructed in any suitable manner.

I have shown a series of endless chains, 37, provided at intervals with the laterally-projecting tines 39. The chains pass over sprockets 41 on a driving-shaft, 43, at the bottom and over sprockets 45 on the shaft 47 at the top.
The shafts 47 and 43 are journaled in bearings on the frame of the machine. Side-boards 49 retain the hay upon the elevator at the two sides of the machine, and guides 108 extend from the top of the boards 49 to the receptacle.

The shaft 43, which operates the elevator-chains, is preferably driven by an endless chain or belt, 38, which engages a sprocket-wheel, 36, on the shaft 17. This chain engages a sprocket-wheel, 48, mounted on a stud on the side of the machine. A gear, 40, is secured to or made integral with this sprocket-wheel and meshes with a gear, 42, that revolves loosely on the shaft 43. A clutch-collar, 51, is formed on the gear 42, and is adapted to be thrown into engagement with a similar collar on the shaft 43. A lever, 52, is pivoted upon the frame of the machine, and is provided with a fork that engages a collar on the gear 42. A lever, 53, pivoted upon the frame of the machine is connected at its lower end to the lever 52. The upper end of the lever 53 is within reach of a person on the seat of the machine, so that the elevator can be thrown into or out of operation at will.

55 are two swinging racks, preferably made in the form of a quarter-circle and hinged or pivoted to the frame 2. Each of the racks 55 is provided with a projecting arm, 57, preferably extending from the rear thereof, to which is pivoted the jaw or clevis 59, which is connected to the rod 61 by the ball-and-socket joint 63. The opposite end of the rod 61 is attached to an arm, 62, on the rock-shaft 65. The outer or actuating arm, 67, of this shaft is connected by a rod, 68, to the segmental gear 69, mounted on a suitable support on the frame 16. The teeth on this gear are set to mesh with the gear 13; but a portion of the teeth in the gear 69 are cut away, so that the gear 13 will revolve in this space without revolving the gear 69. A pin, 71, is preferably located on the inside of the said gear 69, and this pin is arranged to strike, when 69 is out of gear, upon the under side of a spring-lever, 72. This lever is secured on the frame of the machine, and is adapted to be moved downward by means of a connecting-rod, 73, and an arm, 74, upon a treadle-shaft, 75. A foot-treadle, 76, is also located upon this shaft within convenient reach of the operator. By pressing the foot upon this treadle the spring-lever is forced downward and bears against the pin 71 on the gear 69, causing the said gear to be partially revolved, sufficiently to bring the teeth on the said gear in mesh with the gear 13, when a complete revolution of the segment-gear will be made. This operation partially revolves the rock-shaft 65, and by the movement of the rod 61, attached thereto, the racks 55 will be swung outward and opened.

77 is a tilting platform, preferably of circular shape, and supported upon a bar, 79, secured to the frame by trunnions 81. This platform fits within the racks 55 and has secured to it a semicircular front, 83. This front extends up to a considerable distance from the platform, and together with the platform and the racks, when closed, form a circular receptacle for the hay as it is delivered from the elevator. I prefer to provide packers 85, to force the hay into the said receptacle in as compact a mass as possible. These packers are suspended upon arms 87 on the shaft 89, which is oscillated through the crank-arm 91 and connecting-rod 93, attached to a face-plate or revolving crank, 92, on the elevator-shaft 47. The lower ends of the packers extend into the receptacle for holding the hay, and the upper ends are arranged to slide through a pivoted block, 95, held in a stationary support, 96. As the center portion of the packers is suspended upon the rocking arm 87 and the upper portion held by the block 95, the arc described by the lever 87, as it passes from its highest to its lowest position, will give to the lower end of the packers an outward as well as a downward movement, and this will have a tendency to throw the hay to the outside of the receptacle and lay it evenly and press it together.

The cranks 91 and 92 are provided with a series of bolt or pin holes by which the pin which secures the connecting-rod may be placed nearer to or farther from the cutter, and thus give any required variation to the stroke of the packers.

97 are spring-pushers hung upon the shaft 99 at the back of the frame and extending downward inside of the hay-receptacle. The lower portions of these pushers are preferably made to curve forward, as shown in Fig. 2, and arranged to swing on the supporting-shaft 99 and be operated by a lever, 104, either attached to the shaft or to the pusher and connected by a rod, 102, to an arm, 98, on the shaft 65. These arms are preferably made so that a greater or less throw to the pusher may be obtained, if desired, by changing the point of connection between said arms and rod. The object of this pusher is to force the hay out of the receptacle at the time the racks are opened.

101 is a roll hung in a tilting frame, 103. This frame is mounted on pivotal supports on the frame 2, and is so arranged that as it swings or tilts upon its pivots the roll will come in contact with the bottom of the platform 77.

The rear portion of the swinging frame 103 is curved, and an arm, 105, attached to the shaft 65, bears upon this curved portion, and as the shaft 65 is operated the arm forces the rear portion of the frame downward and the roll at the other end is carried upward and carries with it the tilting bottom or platform upon which the hay has been packed. As the racks are opened at the same time, the hay will slide out upon the ground.

The operation of my device is as follows: The rake-teeth are properly adjusted by means of the lever 20, and the train of gearing set in motion by throwing the pinion 9, attached to the lever 11, into mesh with the gears 7 13 15. As the machine is advanced, the hay accumulates in front of the rake and is carried up by the action of the arms on the shafts 17 and 19, and passed back to the elevator, by which it is carried up and delivered to the receptacle at the back of the machine, formed, as before described, by the swinging racks and the tilting bottom. The racks are closed while the process of filling is going on. As the hay is fed into the receptacle, the packers 85 force the hay down into the said receptacle in a compact mass until it is full. The foot is now placed upon the treadle 76, and the lever 72 is forced down, striking and carrying with it the pin on the gear 69, thus partially revolving said gear. This motion brings the teeth on the gear in mesh with those on the revolving gear 13, which cause a revolution of the gear 69. This operates the shaft 65 through the crank 67 and connecting-rod and gives it a part of a revolution. This movement of the shaft swings the arms 62, and these arms being connected to the projecting arm 57 on the rack 55, by means of the jointed rod 61, causes the racks 55 to swing on their hinges or pivots and open outward and leave a free exit for the hay. At the same time the roll 101 (operated, as before described, by the arm 105 on the shaft 65) strikes the under side of the tilting platform 77, raising the front and causing it to incline toward the back in order to facilitate dropping or depositing the hay contained in the receptacle.

Simultaneously with the two operations above mentioned the spring-pushers are brought into action. These are located within the receptacle in front of the hay, and being thrown outward by the same operation of the shaft 65 force the hay off from the platform and deposits it upon the ground.

By the operation of the lever, within easy reach of the operator, the gear which drives the elevator may be thrown out and the elevator stopped. This will also stop the action of the packers. I prefer to do this at the time when the hay is being forced from the receptacle.

I claim as my invention—

1. The combination, in a machine of the class described, of a hay-rake, an elevator for raising the hay gathered by said rake, a receptacle arranged to receive the hay from said elevator and composed of a tilting platform having fronts 83 secured to it, and swinging racks vertically pivoted upon projections on the frame of the machine, packers for compressing the hay in said receptacle, and pushers for discharging the hay from said receptacle, substantially as described.

2. The combination, in a machine of the class described, with the hay rake and elevator, of the hay-receptacle composed of a tilting platform mounted on a suitable pivot or axis and having the fronts 83, the segmental swinging and opening racks 55, pivoted upon the frame of the machine, means to swing said racks, whereby they are opened or closed, and means to tilt said platform, substantially as described.

3. The combination, in a machine of the class described, with the hay rake and elevator, of the receptacle formed of the tilting platform having the fronts 83, and the vertically hinged racks 55, mounted upon suitable projections from the frame of the machine and adapted to swing open, the pushers 97, and means for tilting said platform, opening said racks, and operating said pushers.

In testimony whereof I have hereunto set my hand this 1st day of October, 1887.

NILS J. NILSON.

In presence of—
   THOMAS LADUM,
   CHRIST J. SKAMSER.